(12) United States Patent
Hudman

(10) Patent No.: US 10,890,694 B2
(45) Date of Patent: Jan. 12, 2021

(54) OPTICAL SYSTEM FOR HEAD-MOUNTED DISPLAY SYSTEM

(71) Applicant: Valve Corporation, Bellevue, WA (US)

(72) Inventor: Joshua Mark Hudman, Issaquah, WA (US)

(73) Assignee: Valve Corporation, Bellevue, WA (US)

(*) Notice: Subject to any disclaimer, the term of this patent is extended or adjusted under 35 U.S.C. 154(b) by 566 days.

(21) Appl. No.: 15/704,813

(22) Filed: Sep. 14, 2017

(65) Prior Publication Data

US 2018/0081092 A1 Mar. 22, 2018

Related U.S. Application Data

(60) Provisional application No. 62/395,513, filed on Sep. 16, 2016.

(51) Int. Cl.
| | |
|---|---|
| *G02B 13/18* | (2006.01) |
| *G02B 3/02* | (2006.01) |
| *G02B 3/08* | (2006.01) |
| *G02B 27/01* | (2006.01) |
| *G02B 3/04* | (2006.01) |

(52) U.S. Cl.
CPC ............ *G02B 3/08* (2013.01); *G02B 3/04* (2013.01); *G02B 27/0172* (2013.01); *G02B 2027/0132* (2013.01)

(58) Field of Classification Search
CPC ........ G02B 3/08; G02B 3/04; G02B 27/0172; G02B 2027/0132
See application file for complete search history.

(56) References Cited

U.S. PATENT DOCUMENTS

| 4,075,483 A | 2/1978 | Tancrell et al. |
|---|---|---|
| 6,269,145 B1 | 7/2001 | Piestrup et al. |

(Continued)

FOREIGN PATENT DOCUMENTS

| CN | 102193118 A | 9/2011 |
|---|---|---|
| JP | 2012194343 A | 10/2012 |
| KR | 10-2014-0115501 A | 10/2014 |

OTHER PUBLICATIONS

Fresnel Technologies, Inc., "High Quality Fresnel Lenses in a Variety of Sizes & Focal Lengths," Brochure, 2004, 12 pages.

(Continued)

*Primary Examiner* — Alicia M Harrington
(74) *Attorney, Agent, or Firm* — Seed Intellectual Property Law Group LLP

(57) ABSTRACT

Systems and methods for providing optical systems which utilize double Fresnel lenses on curved surfaces for use with display systems, such as silicon-based micro display systems (e.g., OLED micro displays) used with head mounted display (HMD) systems. The optical systems disclosed herein may implement multiplexing or blending to provide a smooth profile transition and reduce aberrations between zones or fields (e.g., small FOV angles, large FOV angles) of a Fresnel surface which is defined by multiple Fresnel patterns or functions. An optical system for a micro display is provided which utilizes double Fresnel lenses on curved surfaces to shorten the focal length while maintaining a good shape factor for moldability and aberration control.

46 Claims, 5 Drawing Sheets

(56) References Cited

U.S. PATENT DOCUMENTS

| | | | |
|---|---|---|---|
| 7,144,111 B1 | 12/2006 | Ross, III et al. | |
| 8,659,840 B2 | 2/2014 | Masuda et al. | |
| 2007/0002467 A1 | 1/2007 | Claytor | |
| 2007/0216851 A1 | 9/2007 | Matsumoto | |
| 2010/0254001 A1* | 10/2010 | Jang | G02B 30/56 359/479 |
| 2012/0120498 A1 | 5/2012 | Harrison et al. | |
| 2012/0274653 A1 | 11/2012 | Tang et al. | |
| 2013/0329304 A1 | 12/2013 | Hua et al. | |
| 2016/0011341 A1 | 1/2016 | Smith | |
| 2016/0209556 A1 | 7/2016 | DeJong | |
| 2017/0336539 A1* | 11/2017 | Perreault | G02B 3/08 |

OTHER PUBLICATIONS

International Search Report and Written Opinion of the International Searching Authority, dated Nov. 17, 2017, for International Application No. PCT/US2017/051579, 14 pages.

Supplemental European Search Report dated Mar. 26, 2020, for European Application No. 17 85 1535, 12 pages.

Vázquez-Molini et al., "New concentrator multifocal Fresnel lens for improved uniformity: design and characterization," Proc. SPIE 7407, High and Low Concentrator Systems for Solar Electric Applications IV, 740701, Aug. 20, 2009. (12 pages).

Vazquez-Molinin et al., "New concentrator multifocal Fresnel lens for improved uniformity: Design and characterization," *The International Society of Optical Engineering*. 740701(1): 740701(11), Aug. 2009, 12 pages.

\* cited by examiner

OPTICAL SYSTEM FOR HEAD-MOUNTED DISPLAY SYSTEM

BACKGROUND

Technical Field

The present disclosure generally relates to optical systems for displays, such as micro displays of head-mounted display systems.

Description of the Related Art

One current generation of virtual reality ("VR") experiences is created using head-mounted displays ("HMDs"), which can be tethered to a stationary computer (such as a personal computer ("PC"), laptop, or game console), combined and/or integrated with a smart phone and/or its associated display, or self-contained. Generally, HMDs are display devices, worn on the head of a user, which have a small display device in front of one (monocular HMD) or each eye (binocular HMD). The display units are typically miniaturized and may include CRT, LCD, Liquid crystal on silicon (LCos), or OLED technologies, for example. A binocular HMD has the potential to display a different image to each eye. This capability is used to display stereoscopic images.

Demand for displays with heightened performance is increasing, including with the growth of smart phones and high-definition televisions, as well as other electronic devices. The growing popularity of virtual reality and augmented reality systems, particularly those using head mounted displays, has further increased such demand. Virtual reality systems typically envelop a wearer's eyes completely and substitute a "virtual" reality for the actual view (or actual reality) in front of the wearer, while augmented reality systems typically provide a semi-transparent or transparent overlay of one or more screens in front of a wearer's eyes such that actual view is augmented with additional information.

However, such head mounted displays, with reduced distance between a viewer's eye and the display and often with a fully obscured field of view, have increased the performance requirements of displays in ways that traditional displays cannot satisfy, let alone to do so at cost-effective levels. Micro displays, such as OLED micro displays, are much smaller than traditional displays but involve additional challenges. For instance, micro displays require very short focal length lenses. Further, because the eye pupil size of a user is fixed, the F/# of a lens of an HMD which uses a micro display is decreased, which tends to increase the aberrations of a particular lens system. Moreover, micro displays have small pixels. This increase the spatial resolution of the HMD optic further increases the challenge to design and manufacture the lens for such an HMD.

BRIEF SUMMARY

An optical system for use with a micro display may be summarized as including a first lens element disposed relatively proximate to the micro display, the first lens element comprising a first surface facing toward the micro display and a second surface facing away from the micro display, the first surface comprising a concave surface and the second surface comprising a concave surface, at least one of the first surface and the second surface having Fresnel features thereon; and a second lens element disposed relatively distal to the micro display, the second lens element comprising a third surface facing toward the micro display and a fourth surface facing away from the micro display, the third surface comprising a convex surface and the fourth surface comprising a concave surface, at least one of the third surface and the fourth surface having Fresnel features thereon. At least the first surface and the third surface may have Fresnel features thereon. At least the second surface and the third surface may have Fresnel features thereon. At least the first surface and the fourth surface may have Fresnel features thereon. At least the second surface and the fourth surface may have Fresnel features thereon. At least three of the first surface, second surface, third surface and fourth surface may have Fresnel features thereon. At least one of the first surface, second surface, third surface and fourth surface may include Fresnel features defined by multiple Fresnel patterns. At least one of the first surface, second surface, third surface and fourth surface may include Fresnel features defined by a single Fresnel pattern. At least one of the first surface, second surface, third surface and fourth surface may include a first zone defined by a first Fresnel pattern and a second zone defined by a second Fresnel pattern.

The at least one of the first surface, second surface, third surface, and fourth surface may include a third zone disposed between the first zone and the second zone, the third zone defined by a third Fresnel pattern which may provide a smooth transition in the third zone between the first zone and the second zone. The third Fresnel pattern may be defined by a first function representative of the first Fresnel pattern at least one of multiplexed with or multiplied by a second function representative of the second Fresnel pattern. Each of at least one of the first surface, second surface, third surface, and fourth surface may include a first zone defined by a first Fresnel pattern and a second zone defined by a second Fresnel pattern. Each of the at least one of the first surface, second surface, third surface, and fourth surface may include a third zone disposed between the first zone and the second zone, the third zone defined by a third Fresnel pattern which may provide a smooth transition in the third zone between the first zone and the second zone. A third function representative of the third Fresnel pattern may be defined by a first function representative of the first Fresnel pattern at least one of multiplexed with or multiplied by a second function representative of the second Fresnel pattern. The first zone may include a central zone and the second zone may include a peripheral zone which surrounds the first zone. The first and second lens elements may have a combined focal length which may be less than 25 mm. The first and second lens elements may provide a field of view which may be at least 85 degrees.

At least one of the first surface, second surface, third surface, and fourth surface may include Fresnel features having a first pitch value, and at least one of the first surface, second surface, third surface, and fourth surface may include Fresnel features having a second pitch value, the first pitch value different from the second pitch value. The Fresnel features of at least one of the first surface, second surface, third surface, and fourth surface may be radially aligned along a central optical axis with the Fresnel features of at least one other of the first surface, second surface, third surface and fourth surface. The Fresnel features of at least one of the first surface, second surface, third surface, and fourth surface may be radially offset along a central optical axis with the Fresnel features of at least one other of the first surface, second surface, third surface and fourth surface. The first lens element and the second lens element may be separated by an air gap, the air gap having an index of refraction which may be less than the index of refraction of the first lens element and the less than the index of refraction of the second lens element.

A head mounted display system may be summarized as including first and second display subsystems which each provide a display for one eye of a user, each of the first and second display subsystems including a micro display; a first lens element disposed relatively proximate to the micro display, the first lens element comprising a first surface facing toward the micro display and a second surface facing away from the micro display, the first surface comprising a concave surface and the second surface comprising a concave surface, at least one of the first surface and the second surface having Fresnel features thereon; and a second lens element disposed relatively distal to the micro display, the second lens element comprising a third surface facing toward the micro display and a fourth surface facing away from the micro display, the third surface comprising a convex surface and the fourth surface comprising a concave surface, at least one of the third surface and the fourth surface having Fresnel features thereon. At least the first surface and the third surface may have Fresnel features thereon. At least the second surface and the third surface may have Fresnel features thereon. At least the first surface and the fourth surface may have Fresnel features thereon. At least the second surface and the fourth surface may have Fresnel features thereon. At least three of the first surface, second surface, third surface and fourth surface may have Fresnel features thereon. The micro display of each of the first and second display subsystems may include a silicon-based micro display. The micro display of each of the first and second display subsystems may have a width dimension and a length dimension which are each less than or equal to 35 mm. The micro display of each of the first and second display subsystems may have a pixel size which is less than or equal to 20 µm.

A head mounted display system may be summarized as including first and second display subsystems which each provide a display for one eye of a user, each of the first and second display subsystems including a micro display; and a lens element disposed relatively proximate to the micro display, the lens element comprising a first surface facing toward the micro display and a second surface facing away from the micro display, the first and second surfaces each comprising a concave surface having Fresnel features thereon. At least one of the first surface and the second surface may include Fresnel features defined by multiple Fresnel patterns. At least one of the first surface and the second surface may include Fresnel features defined by a single Fresnel pattern. At least one of the first surface and the second surface may include a first zone defined by a first Fresnel pattern and a second zone defined by a second Fresnel pattern. At least one of the first surface and the second surface may include a third zone disposed between the first zone and the second zone, the third zone defined by a third function which may provide a smooth transition in the third zone between the first zone and the second zone. The third function may be defined by a first function representative of the first Fresnel pattern at least one of multiplexed with or multiplied by a second function representative of the second Fresnel pattern. Each of the first surface and the second surface may include a first zone defined by a first Fresnel pattern and a second zone defined by a second Fresnel pattern. Each of the first surface and the second surface may include a third zone disposed between the first zone and the second zone, the third zone defined by a third function which may provide a smooth transition in the third zone between the first zone and the second zone.

The third function may be defined by a first function representative of the first Fresnel pattern at least one of multiplexed with or multiplied by a second function representative of the second Fresnel pattern. The first zone may include a central zone and a second zone may include a peripheral zone which surrounds the first zone. The micro display may include a silicon-based micro display. The lens element may have a focal length which may be less than 25 mm. The lens element may provide a field of view which may be at least 85 degrees. The first surface may include Fresnel features having a first pitch value and the second surface may include Fresnel features having a second pitch value, the first pitch value different from the second pitch value. The Fresnel features of the first surface may be radially aligned along central optical axis with the Fresnel features of the second surface. The Fresnel features of the first surface may be radially offset along a central optical axis with the Fresnel features of the second surface.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

Figure 1:
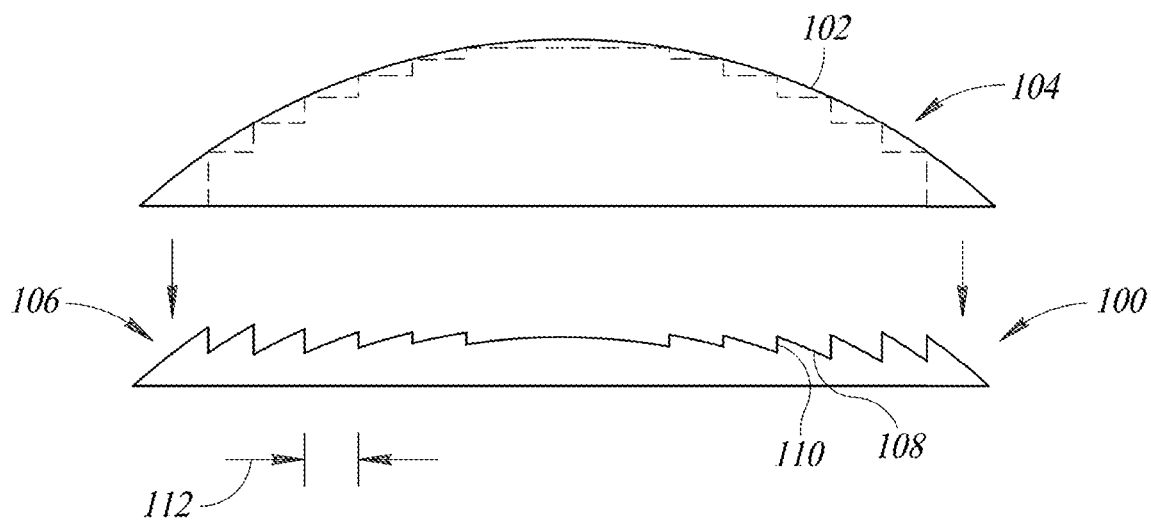
FIG. 1 is an illustration of a Fresnel lens, according to one illustrated implementation.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

One or more implementations of the present disclosure are directed to optical systems which utilize stacked or double Fresnel lenses for use with display systems, such as silicon-based micro display systems (e.g., OLED micro displays) used with HMD systems. As used herein, "micro display systems" or "micro displays" refer to displays which have width and length dimensions which are each less than 35 mm (e.g., 12×12 mm, 20×20 mm, 30×30 mm, 18×30, 12×35 mm), and have a pixel size which is less than approximately 20 µm (e.g., 5 µm, 8 µm, 10 µm, 15 µm, 20 µm).

One or more implementations discussed herein also provide optical systems which implement multiplexing or blending to provide a smooth profile transition and reduce aberrations between zones or fields (e.g., small FOV angles, large FOV angles) of a Fresnel surface which is defined by multiple different Fresnel patterns (e.g., two different Fresnel patterns). In at least some implementations, an optical system for a micro display is provided which utilizes double Fresnel lenses on curved surfaces to shorten the focal length while maintaining a good shape factor for moldability and aberration control. Such design allows for good aberration control while providing a large eyebox and low pupil swim.

Generally, Fresnel lenses are a type of lens which provides a large aperture and a short focal length without requiring the mass and volume of material that would otherwise be required by a lens of conventional design. FIG. 1 shows a Fresnel lens 100 which may be conventionally used as an optical system for a HMD. The Fresnel lens 100 may include a periodic refractive structure of concentric prisms. The surfaces of each of these prisms are designed to refract light by collapsing an aspheric surface 102 of a corresponding conventional lens 104 into nearly a plane. Hence, the reduction in bulk lens thickness may be considered to be substantially equal to the volume bounded by the original aspheric surface 102 and the new lens surface defined by the surface of the prisms. As noted above, this bulk reduction allows Fresnel lenses to be substantially thinner and lighter than their conventional counterparts, which is advantageous for HMD systems where reduced size and weight are important.

The refractive surfaces 106 of the prisms which make up the Fresnel surface may be referred to as grooves 108 and drafts 110. The grooves 108 and drafts 110 may be collectively referred to herein as "Fresnel features," "Fresnel cuts," or "microfeatures," and the overall shape and dimensions of the grooves and drafts may be referred to as a Fresnel pattern. The grooves 108 are the actual surfaces which are used to approximate the continuous curvature of the aspheric surface 102 of the conventional lens 104, while the drafts 110 are the discontinuities between the grooves that are required to return the curvature of the lens back to a plane (or curved surface, as discussed below). The lateral distance between the peaks of adjacent grooves is referred to as the pitch 112. As an example, the Fresnel lens may a pitch of 500 µm. As discussed further below, the pitch for a Fresnel surface may be constant or variable across the lateral surface of a Fresnel lens. Further, although the Fresnel lens is shown in FIG. 1 on a planar surface for explanatory purposes, in at least some of the implementations discussed herein Fresnel surfaces are provides on curved surfaces (e.g., concave surfaces, convex surfaces) which, as discussed below, allows for unique and advantageous aberration control.

Figure 2:
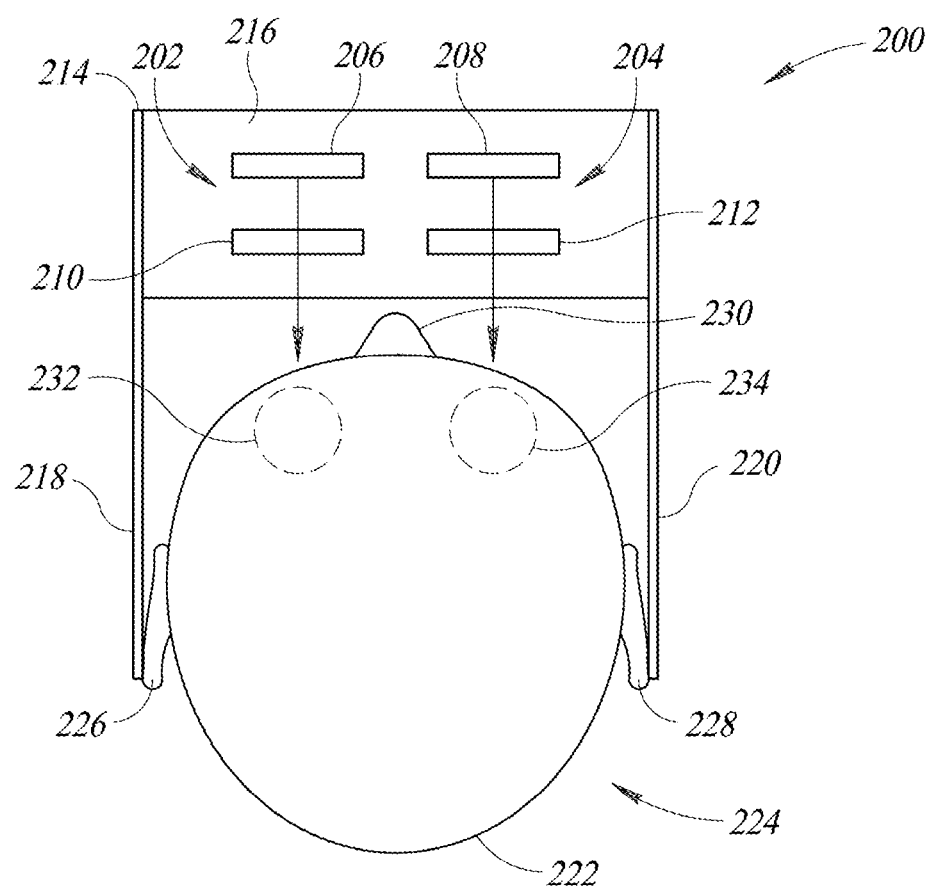
FIG. 2 is a top plan view of a binocular head mounted display (HMD) system, according to one illustrated implementation.

FIG. 2 is a simplified top plan view of an HMD system 200 which includes a pair of near-to-eye display systems 202 and 204. The near-to-eye display systems 202 and 204 include displays 206 and 208, respectively (e.g., OLED micro display), and respective optical systems 210 and 212. The display systems 202 and 204 may be mounted to frame 214 which includes a front portion 216, a left temple 218 and right temple 220. The two display systems 202 and 204 may be secured to the frame 214 in an eye glasses arrangement which can be worn on the head 222 of a user 224. The left temple 218 and right temple 220 may rest over the user's ears 226 and 228, respectively, while a nose assembly (not shown) may rest over the user's nose 230. The frame 214 may be shaped and sized to position each of the two optical systems 210 and 212 in front of one of the user's eyes 232 and 234, respectively. Although the frame 214 is shown in a simplified manner similar to eyeglasses for explanatory purposes, it should be appreciated that in practice more sophisticated structures (e.g., goggles, integrated headband, helmet, straps) may be used to support and position the displays systems 202 and 204 on the head 222 of user 224.

The HMD system 200 of FIG. 2 is capable of presenting a virtual reality to the user 224. Each of the displays 206 and 208 may generate light which is transmitted through and focused by the respective optical systems 210 and 212 onto the eyes 232 and 234, respectively, of the user 224. The light is seen by the user 224 as images and/or video. In some implementations, the distance between each of the optical systems 210 and 212 and the user's eyes 232 and 234 may be relatively short (e.g., less than 30 mm, less than 20 mm), which advantageously causes the HMD system 200 to appear lighter to the user since the weight of the optical systems and the display systems are relatively close to the user's face.

Figure 3:
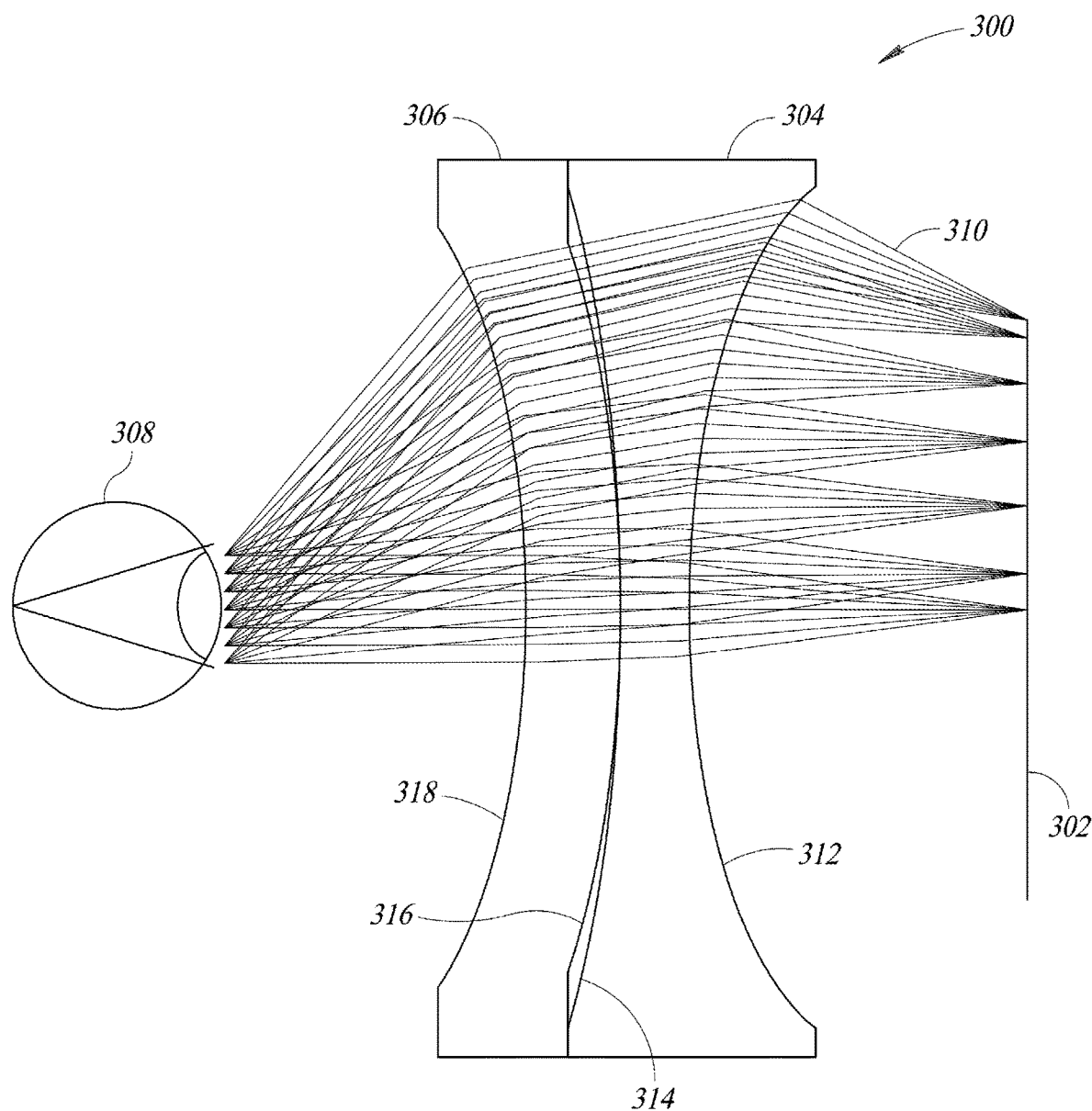
FIG. 3 is a left-side sectional elevational view of an optical system of the HMD system of FIG. 2 which includes a double Fresnel two element design, according to one illustrated implementation.

FIG. 3 shows a left-side sectional elevational view of an optical system 300 (e.g., optical system 210 or optical system 212 of FIG. 2) and a display 302 of the head mounted display system 200 of FIG. 2 which includes a double Fresnel two element design. The display 302 may be a silicon-based micro display (e.g., OLED micro display), for example. In this implementation, the optical system 300 includes a first hybrid Fresnel lens element 304 which is positioned relatively proximate to the display 302, and a second hybrid Fresnel lens element 306 which is positioned relatively distal (relative to the first lens element 304) to the display and at least substantially adjacent the first lens element. The positions of the optical system 300 and the display 302 are shown relative to an eye 308 (e.g., left eye or right eye) of a user wearing the HMD system 200 (see FIG. 2). As shown, the distance between the optical system 300 and the user's eye 308 may be relatively short (e.g., less than 25 mm, less than 20 mm). Light paths 310 between the display 302 and the user's eye 308 for light emitted by pixels of the display are also shown in FIG. 3.

The first lens element 304 includes a first surface 312 facing toward the micro display 302 and a second surface 314 facing away from the micro display. In at least some implementations, the first surface 312 is a Fresnel surface which is concave and has Fresnel features (e.g., grooves, drafts) thereon. Thus, the positive power of a Fresnel surface is "collapsed" onto a negative or concave element, which causes positive and negative aberrations to cancel each other. The Fresnel features are not shown in FIG. 3 for the sake of simplicity. In at least some implementations, the second surface 314 may be a smooth concave surface having a profile which is spherical, aspherical, conical, etc.

The second lens element 306 has a third surface 316 facing toward the micro display 302 and a fourth surface 318 facing away from the micro display (i.e., facing toward the user's eye 308). In at least some implementations, the third surface 316 is a Fresnel surface which is convex and has Fresnel features (e.g., grooves, drafts) thereon. In at least some implementations, the fourth surface 318 may be a smooth concave surface having a profile which is spherical, aspherical, conical, etc.

Other combinations of Fresnel surfaces and smooth surfaces may be implemented. For example, in at least some implementations the surfaces 314 and 316 are Fresnel surfaces and the surfaces 312 and 318 are smooth surfaces. Such implementations may be advantageous by providing two Fresnel surfaces with opposing high-to-low and low-to-high index of refraction transitions. For instance, the low-to-high index of refraction transition between the air gap between the lens elements 304 and 306, which has a relatively lower index of refraction, and the surface 316 of the lens element 306, may function to cancel or reduce aberrations introduced by the high-to-low index of refraction transition between the surface 314 of the lens element 304 and the air gap.

More generally, any combination of at least two of the surfaces 312, 314, 316 and 318 may be Fresnel surfaces, and the non-Fresnel lenses (if any) may be smooth surfaces. Further, any combination of the surfaces 312, 314, 316 and 318 may be concave surfaces, convex surfaces, planar surfaces, etc.

Any of the Fresnel surfaces may be defined by a single Fresnel pattern or by multiple Fresnel patterns (e.g., two Fresnel patterns, four Fresnel patterns). As an example, one or more of the Fresnel surfaces may be defined by a first Fresnel pattern having a first associated focal length for relatively small fields of view (FOV) angles (e.g., 0-50 degrees) and defined by a second Fresnel pattern having a second associated focal length for relatively large FOV angles (e.g., 50-110 degrees). As discussed further below with reference to FIG. 5, in some implementations, two different Fresnel patterns or equations associated with first and second regions or zones of a Fresnel surface may be multiplexed, multiplied, or otherwise "blended" to provide a smooth transition in a third zone which is disposed between the first and second zones, which reduces aberrations at the edges of the first and second zones.

Advantageously, the optical system 300 of FIG. 3 allows four surfaces, i.e., surfaces 312, 314, 316, and 318 to behave similar to six surfaces because in at least some implementations at least two of the surfaces (e.g., surfaces 312 and 316, surfaces 314 and 316) provide Fresnel features as well as curved surface features (e.g., convex concave), which provides unique and advantageous aberration control.

Figure 4:
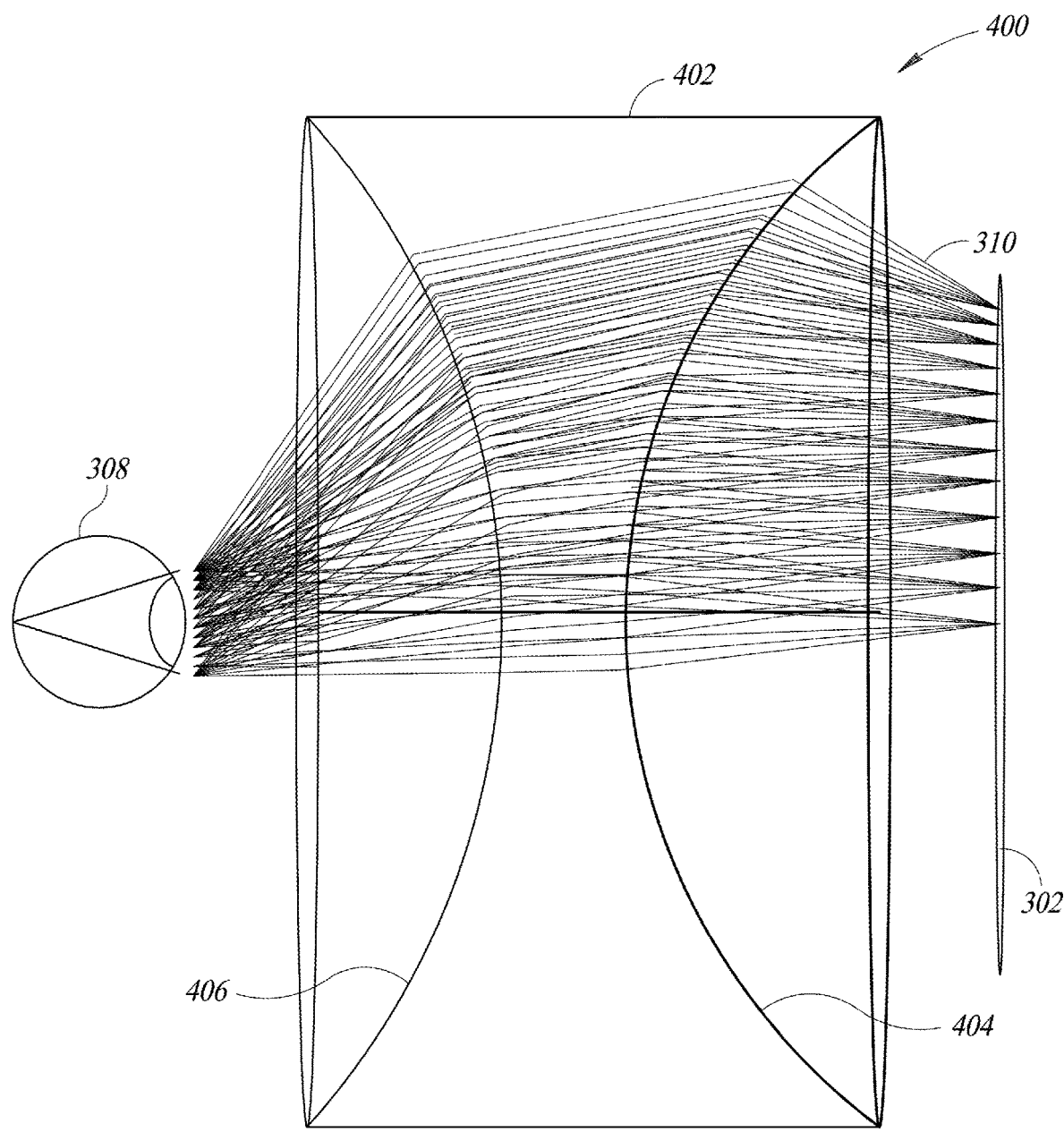
FIG. 4 is a left-side sectional elevational view of an optical system of the HMD system of FIG. 2 which includes a double Fresnel single element design, according to one illustrated implementation.

FIG. 4 shows a left-side sectional elevational view of an optical system 400 which may be used in an HMD system, such as the HMD system 200 of FIG. 2. The optical system 400 provides a double Fresnel single element design. In this implementation, the optical system 400 includes a single hybrid Fresnel lens element 402 which is positioned proximate to the display 302 between the user's eye 308 and the display. As shown, the distance between the lens element 402 and the user's eye 308 may be relatively short (e.g., less than 25 mm, less than 20 mm). Light paths 310 between the display 302 and the user's eye 308 for light emitted by pixels of the display are also shown in FIG. 4.

The lens element 402 includes a first surface 404 facing toward the micro display 302 and a second surface 406 facing away from the micro display. The first surface 404 is a Fresnel surface which is concave and has Fresnel features (e.g., grooves, drafts) thereon. The second surface 406 is also a Fresnel surface which is concave and has Fresnel features thereon. The Fresnel features are not shown for the sake of simplicity. In some implementations, the second surface 406 may have a larger radius of curvature than the first surface 404 such that no total internal reflection (TIR) condition occurs at the second surface. Like the Fresnel surfaces 312 and 316 of FIG. 3 discussed above, the Fresnel surfaces 404 and 406 of the lens element 402 may each be defined by a single Fresnel pattern or by multiple Fresnel patterns.

Figure 5:
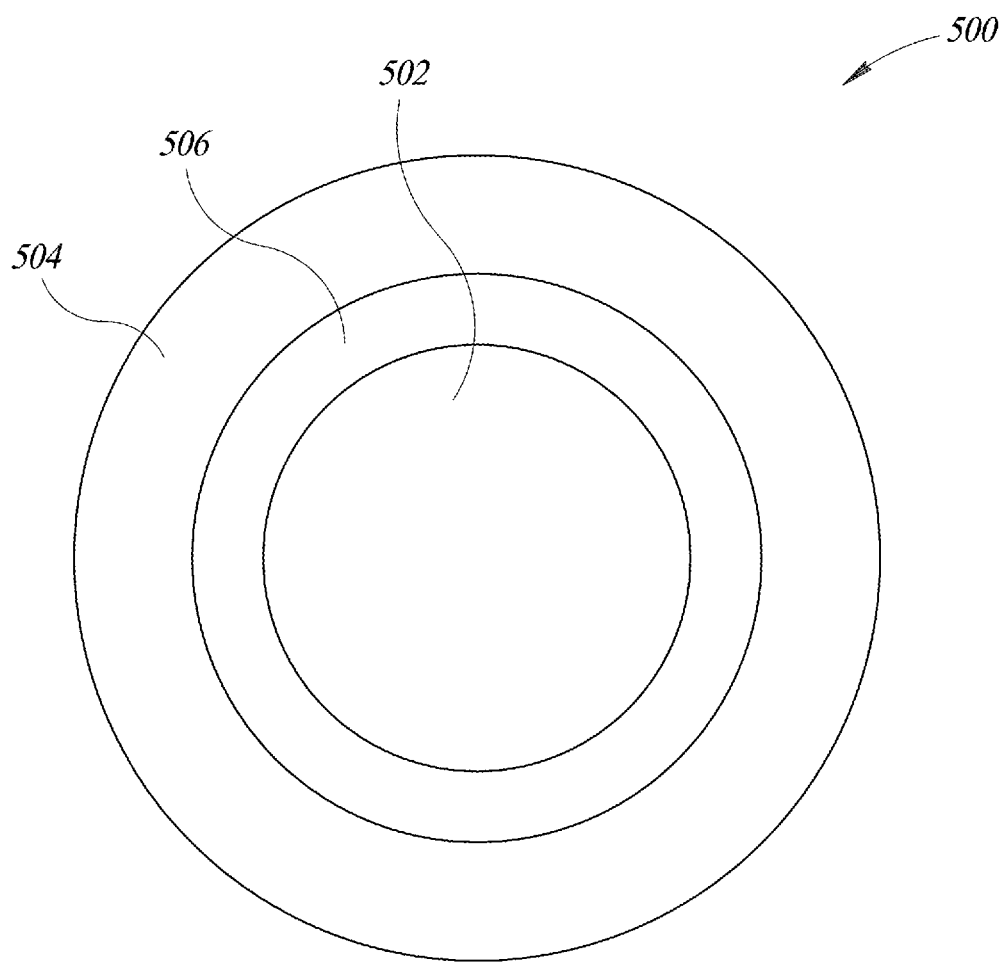
FIG. 5 is a top plan view of a single element of an optical system of the HMD system of FIG. 2, according to one illustrated implementation.

FIG. 5 is a top plan view of a Fresnel surface 500 of a lens element of an optical system of an HMD system, such as the HMD system 200 of FIG. 2. The Fresnel surface 500 may be representative of any of the Fresnel surfaces discussed above. As shown, the Fresnel surface 500 has a first or central zone 502 which has a profile defined by a first Fresnel pattern or equation. The Fresnel surface 500 also has a second or peripheral zone 504 which has a profile defined by a second Fresnel pattern or equation different from the first Fresnel pattern or equation. In this example, a third or transition zone 506 may be provided which has a profile that provides a smooth transition between the central zone 502 and the peripheral zone 504. For example, the two Fresnel patterns or equations for the first and second zones may be multiplexed, multiplied, or otherwise blended to provide a transition equation or function which defines the profile of the Fresnel surface in the third or transition zone 506 which smoothly couples the first and second zones together without a discontinuity. Any suitable method may be used to generate a smooth profile transition between the central zone 502 and the peripheral zone 504. Additionally, in some implementations, the Fresnel surface 500 may be defined by more than two (e.g., three, six, nine) Fresnel patterns or equations. In such instances, the techniques discussed herein may be used to provide a smooth transition between any or all adjacent zones of a Fresnel surface, which advantageously reduce aberrations at the edges of such zones.

Figure 6:
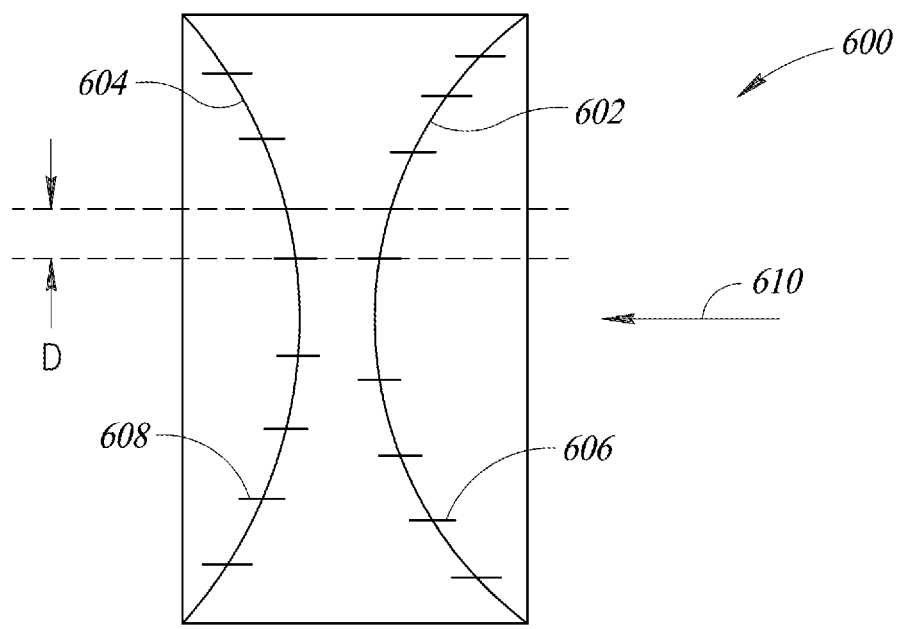
FIG. 6 is a left-side sectional elevational view of a double Fresnel lens element which includes a first surface which has Fresnel features which are offset from Fresnel features of an opposite second surface, according to one illustrated implementation.

FIG. 6 shows a simplified left-side sectional elevational view of a double Fresnel lens element 600 which includes a first Fresnel surface 602 and a second Fresnel surface 604. The features of the lens element 600 may be implemented in any of the lens elements discussed above. In FIG. 6, hash marks 606 are shown to indicate boundaries between adjacent grooves on the first Fresnel surface 602, and hash marks 608 are shown to indicate boundaries between adjacent grooves on the second Fresnel surface 604. The distance between adjacent hash marks on a Fresnel surface represents the pitch for the Fresnel surface. An arrow 610 shows an optical axis for light emitted by a display (e.g., display 302 of FIGS. 3 and 4) toward the lens element 600. As shown, the Fresnel features of the first Fresnel surface 602 are offset by an offset distance D from Fresnel features of the second Fresnel surface 604. The offset distance D may be any suitable value (e.g., ⅓ pitch, ½ pitch, ⅔ pitch, 3/2 pitch, 5/2 pitch). That is, the power of the surfaces 602 and 604 may be the same, but the respective pitches of the Fresnel patterns on each surface may be radially offset (e.g., shifted) relative to each other with respect to the central optical axis 610. In other implementations, the Fresnel features of the first Fresnel surface 602 may be radially aligned with the Fresnel features of the second Fresnel surface 604 rather than being offset therefrom.

Figure 7:
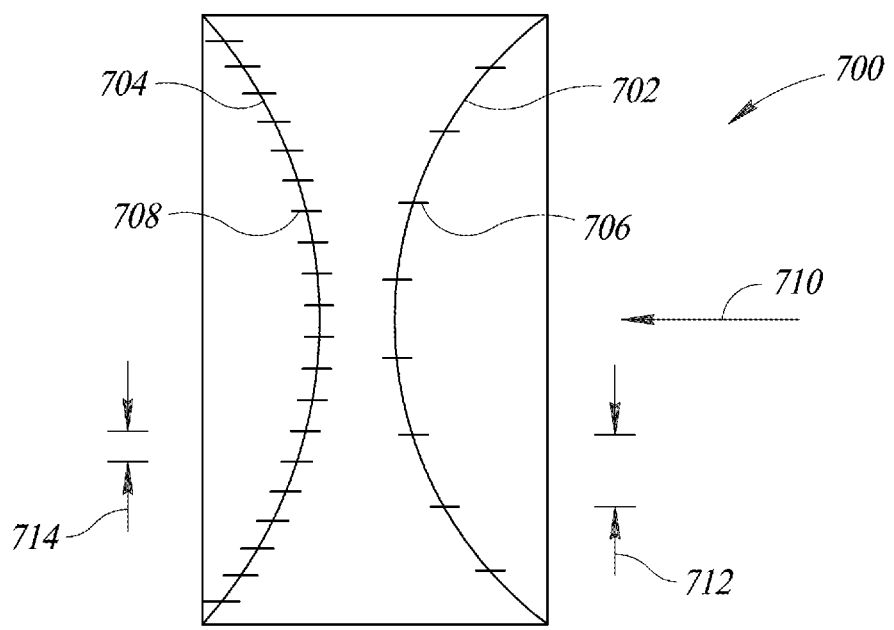
FIG. 7 is a left-side sectional elevational view of a double Fresnel lens element which includes a first surface which has Fresnel features which have a first pitch value which is different from a second pitch value of Fresnel features of an opposite second surface, according to one illustrated implementation.

FIG. 7 shows a simplified left-side sectional elevational view of a double Fresnel lens element 700 which includes a first Fresnel surface 702 and a second Fresnel surface 704. The features of the lens element 700 may be implemented in any of the lens elements discussed above. In FIG. 7, hash marks 706 are shown to indicate boundaries between adjacent grooves on the first Fresnel surface 702, and hash marks 708 are shown to indicate boundaries between adjacent grooves on the second Fresnel surface 704. The distance between adjacent hash marks on a Fresnel surface represents the pitch for the Fresnel surface. An arrow 710 shows an optical axis for light emitted by a display (e.g., the display 302 of FIG. 3) toward the lens element 700. As shown in FIG. 7, the pitch 712 of the Fresnel features of the first Fresnel surface 702 is different from the pitch 714 of the Fresnel features of the second Fresnel surface 704. For example, the first Fresnel surface 702 may have Fresnel features having a pitch value 712 of 500 μm, and the second Fresnel surface 704 may have Fresnel features having a pitch value 714 of 200 μm, 550 μm, 800 μm, 1000 μm, etc. In other implementations, the pitch of the Fresnel features of the first Fresnel surface 702 may be the same as the pitch of the Fresnel features of the second Fresnel surface 704 rather than being different therefrom. Additionally, as noted above, the pitch of a Fresnel surface may be constant or variable across the radius of the Fresnel surface. In some implementations where the respective pitches of the Fresnel surfaces 702 and 704 are variable across the radius of the Fresnel surfaces, the pitch of the Fresnel surface 702 at a particular radius may be different from the pitch of the Fresnel surface 704 at the same radius.

It will be appreciated that in some embodiments the functionality discussed above may be provided in alternative ways. Similarly, in some embodiments illustrated configurations may provide more or less functionality than is described, such as when other illustrated configurations instead lack or include such functionality respectively, or when the amount of functionality that is provided is altered. In addition, while various operations may be illustrated as being performed in a particular manner and/or in a particular order, those skilled in the art will appreciate that in other embodiments the operations may be performed in other orders and in other manners.

From the foregoing it will be appreciated that, although specific embodiments have been described herein for purposes of illustration, various modifications may be made without deviating from the spirit and scope of the present disclosure. In addition, while certain aspects of the present disclosure are presented at times in certain claim forms, or may not be embodied in any claims at some times, the inventors contemplate the various aspects of the invention in any available claim form.

The invention claimed is:

1. An optical system for use with a micro display to focus light from the micro display onto an eye of a user, the optical system comprising:
   a first lens element disposed relatively proximate to the micro display, the first lens element comprising a first surface facing toward the micro display and a second surface facing away from the micro display toward the eye of the user, the first surface comprising a concave shape that provides negative power and the second surface comprising a concave shape that provides negative power, and at least one of the first surface and the second surface having Fresnel features thereon that provide include grooves that approximate the continuous curvature of a lens that provides positive power, wherein, for each of the first surface and second surface that includes Fresnel features thereon, the Fresnel features on the surface and the concave shape of the surface cause positive aberrations and negative aberrations to cancel each other; and
   a second lens element disposed relatively distal to the micro display, the second lens element comprising a third surface facing toward the micro display and a fourth surface facing away from the micro display toward the eye of the user, the third surface comprising a convex shape and the fourth surface comprising a concave shape, at least one of the third surface and the fourth surface having Fresnel features thereon.

2. The optical system of claim 1 wherein at least the first surface and the third surface have Fresnel features thereon.

3. The optical system of claim 1 wherein at least the second surface and the third surface have Fresnel features thereon.

4. The optical system of claim 1 wherein at least the first surface and the fourth surface have Fresnel features thereon.

5. The optical system of claim 1 wherein at least the second surface and the fourth surface have Fresnel features thereon.

6. The optical system of claim 1 wherein at least three of the first surface, second surface, third surface and fourth surface have Fresnel features thereon.

7. The optical system of claim 1 wherein at least one of the first surface, second surface, third surface and fourth surface comprises Fresnel features defined by multiple Fresnel patterns, at least one of the multiple Fresnel patterns providing a different focal length than a focal length provided by another of the multiple Fresnel patterns.

8. The optical system of claim 1 wherein at least one of the first surface, second surface, third surface and fourth surface comprises Fresnel features defined by a single Fresnel pattern.

9. The optical system of claim 1 wherein at least one of the first surface, second surface, third surface and fourth surface includes a first zone defined by a first Fresnel pattern that provides a first focal length and a second zone defined by a second Fresnel pattern that provides a second focal length, the first focal length different from the second focal length.

10. The optical system of claim 9 wherein the at least one of the first surface, second surface, third surface, and fourth surface includes a third zone disposed between the first zone and the second zone, the third zone defined by a third Fresnel pattern which provides a smooth transition in the third zone between the first zone and the second zone.

11. The optical system of claim 10 wherein the third Fresnel pattern is defined by a first function representative of the first Fresnel pattern at least one of multiplexed with or multiplied by a second function representative of the second Fresnel pattern.

12. The optical system of claim 9 wherein the first zone comprises a central zone and the second zone comprises a peripheral zone which surrounds the first zone.

13. The optical system of claim 1 wherein each of at least one of the first surface, second surface, third surface, and fourth surface includes a first zone defined by a first Fresnel pattern and a second zone defined by a second Fresnel pattern.

14. The optical system of claim 13 wherein each of the at least one of the first surface, second surface, third surface, and fourth surface includes a third zone disposed between the first zone and the second zone, the third zone defined by a third Fresnel pattern which provides a smooth transition in the third zone between the first zone and the second zone.

15. The optical system of claim 14 wherein a third function representative of the third Fresnel pattern is defined by a first function representative of the first Fresnel pattern at least one of multiplexed with or multiplied by a second function representative of the second Fresnel pattern.

16. The optical system of claim 1 wherein the first and second lens elements have a combined focal length which is less than 25 mm.

17. The optical system of claim 1 wherein the first and second lens elements provide a field of view which is at least 85 degrees.

18. The optical system of claim 1 wherein at least one of the first surface, second surface, third surface, and fourth surface comprise Fresnel features having a first pitch value, and at least one of the first surface, second surface, third surface, and fourth surface comprises Fresnel features having a second pitch value, the first pitch value different from the second pitch value.

19. The optical system of claim 1 wherein the Fresnel features of at least one of the first surface, second surface, third surface, and fourth surface are radially aligned along a central optical axis with the Fresnel features of at least one other of the first surface, second surface, third surface and fourth surface.

20. The optical system of claim 1 wherein the first lens element and the second lens element are separated by an air gap, the air gap having an index of refraction which is less than the index of refraction of the first lens element and the less than the index of refraction of the second lens element.

21. An optical system for use with a micro display, the optical system comprising:
a first lens element disposed relatively proximate to the micro display, the first lens element comprising a first surface facing toward the micro display and a second surface facing away from the micro display, the first surface comprising a concave shape and the second surface comprising a concave shape, at least one of the first surface and the second surface having Fresnel features thereon; and
a second lens element disposed relatively distal to the micro display, the second lens element comprising a third surface facing toward the micro display and a fourth surface facing away from the micro display, the third surface comprising a convex shape and the fourth surface comprising a concave shape, at least one of the third surface and the fourth surface having Fresnel features thereon,
wherein the Fresnel features of at least one of the first surface, second surface, third surface, and fourth surface are radially offset along a central optical axis with the Fresnel features of at least one other of the first surface, second surface, third surface and fourth surface.

22. A head mounted display system, comprising:
first and second display subsystems which each provide a display for one eye of a user, each of the first and second display subsystems comprising:
a micro display; and
an optical system to focus light from the micro display onto an eye of the user, the optical system comprising:
a first lens element disposed relatively proximate to the micro display, the first lens element comprising a first surface facing toward the micro display and a second surface facing away from the micro display toward an eye of the user, the first surface comprising a concave shape that provides negative power and the second surface comprising a concave shape that provides negative power, and at least one of the first surface and the second surface having Fresnel features thereon that include grooves that approximate the continuous curvature of a lens that provides positive power, wherein, for each of the first surface and second surface that includes Fresnel features thereon, the Fresnel features on the surface and the concave shape of the surface cause positive aberrations and negative aberrations to cancel each other; and
a second lens element disposed relatively distal to the micro display, the second lens element comprising a third surface facing toward the micro display and a fourth surface facing away from the micro display toward an eye of the user, the third surface comprising a convex shape and the fourth surface comprising a concave shape, at least one of the third surface and the fourth surface having Fresnel features thereon.

23. The head mounted display system of claim 22 wherein at least the first surface and the third surface have Fresnel features thereon.

24. The head mounted display system of claim 22 wherein at least the second surface and the third surface have Fresnel features thereon.

25. The head mounted display system of claim 22 wherein at least the first surface and the fourth surface have Fresnel features thereon.

26. The head mounted display system of claim 22 wherein at least the second surface and the fourth surface have Fresnel features thereon.

27. The head mounted display system of claim 22 wherein at least three of the first surface, second surface, third surface and fourth surface have Fresnel features thereon.

28. The head mounted display system of claim 22 wherein the micro display of each of the first and second display subsystems comprises a silicon-based micro display.

29. The head mounted display system of claim 22 wherein the micro display of each of the first and second display subsystems has a width dimension and a length dimension which are each less than or equal to 35 mm.

30. The head mounted display system of claim 29 wherein the micro display of each of the first and second display subsystems has a pixel size which is less than or equal to 20 µm.

31. A head mounted display system, comprising:
first and second display subsystems which each provide a display for one eye of a user, each of the first and second display subsystems comprising:
a micro display; and
a lens element disposed relatively proximate to the micro display to focus light from the micro display onto an eye of the user, the lens element comprising a first surface facing toward the micro display and a second surface facing away from the micro display toward the eye of the user, the first and second surfaces each comprising a concave shape having Fresnel features thereon that include grooves that approximate the continuous curvature of a lens that provides positive power, wherein, for each of the first surface and second surface that includes Fresnel features thereon, the Fresnel features on the surface and the concave shape of the surface cause positive aberrations and negative aberrations to cancel each other.

32. The head mounted display system of claim 31 wherein at least one of the first surface and the second surface comprises Fresnel features defined by multiple Fresnel patterns.

33. The head mounted display system of claim 31 wherein at least one of the first surface and the second surface comprises Fresnel features defined by a single Fresnel pattern.

34. The head mounted display system of claim 31 wherein at least one of the first surface and the second surface includes a first zone defined by a first Fresnel pattern and a second zone defined by a second Fresnel pattern.

35. The head mounted display system of claim 34 wherein at least one of the first surface and the second surface includes a third zone disposed between the first zone and the second zone, the third zone defined by a third function which provides a smooth transition in the third zone between the first zone and the second zone.

36. The head mounted display system of claim 35 wherein the third function is defined by a first function representative of the first Fresnel pattern at least one of multiplexed with or multiplied by a second function representative of the second Fresnel pattern.

37. The head mounted display system of claim 31 wherein each of the first surface and the second surface includes a first zone defined by a first Fresnel pattern and a second zone defined by a second Fresnel pattern.

38. The head mounted display system of claim 37 wherein each of the first surface and the second surface includes a third zone disposed between the first zone and the second zone, the third zone defined by a third function which provides a smooth transition in the third zone between the first zone and the second zone.

39. The head mounted display system of claim 38 wherein the third function is defined by a first function representative of the first Fresnel pattern at least one of multiplexed with or multiplied by a second function representative of the second Fresnel pattern.

40. The head mounted display system of claim 37 wherein the first zone comprises a central zone and a second zone comprises a peripheral zone which surrounds the first zone.

41. The head mounted display system of claim 31 wherein the micro display comprises a silicon-based micro display.

42. The head mounted display system of claim 31 wherein the lens element has a focal length which is less than 25 mm.

43. The head mounted display system of claim 31 wherein the lens element provides a field of view which is at least 85 degrees.

44. The head mounted display system of claim 31 wherein the first surface comprises Fresnel features having a first pitch value and the second surface comprises Fresnel features having a second pitch value, the first pitch value different from the second pitch value.

45. The head mounted display system of claim 31 wherein the Fresnel features of the first surface are radially aligned along central optical axis with the Fresnel features of the second surface.

46. A head mounted display system, comprising:
first and second display subsystems which each provide a display for one eye of a user, each of the first and second display subsystems comprising:
a micro display; and
a lens element disposed relatively proximate to the micro display, the lens element comprising a first surface facing toward the micro display and a second surface facing away from the micro display, the first and second surfaces each comprising a concave shape having Fresnel features thereon, wherein the Fresnel features of the first surface are radially offset along a central optical axis with the Fresnel features of the second surface.

* * * * *

UNITED STATES PATENT AND TRADEMARK OFFICE
CERTIFICATE OF CORRECTION

PATENT NO. : 10,890,694 B2  
APPLICATION NO. : 15/704813  
DATED : January 12, 2021  
INVENTOR(S) : Joshua Mark Hudman Page 1 of 1

It is certified that error appears in the above-identified patent and that said Letters Patent is hereby corrected as shown below:

On the Title Page

Page 2, Item (56) References Cited, Other Publications, Column 1, Reference 3:
"Vázquez-Molini et al., "New concentrator multifocal Fresnel lens for improved uniformity: design and characterization," Proc. SPIE 7407, High and Low Concentrator Systems for Solar Electric Applications IV, 740701, Aug. 20, 2009. (12 pages)." should read, --Vázquez-Molini et al., "New concentrator multifocal Fresnel lens for improved uniformity: design and characterization," Proc. SPIE 7407, High and Low Concentrator Systems for Solar Electric Applications IV, 740701, Aug. 20, 2009. (12 pages).--.

In the Claims

Column 10, Line 26:
"provide include grooves that approximate the continuous" should read, --include grooves that approximate the continuous--.

Signed and Sealed this  
Twenty-sixth Day of October, 2021

Drew Hirshfeld  
*Performing the Functions and Duties of the*  
*Under Secretary of Commerce for Intellectual Property and*  
*Director of the United States Patent and Trademark Office*